Dec. 4, 1951         W. A. WILDHACK           2,576,985
                   LIQUID OXYGEN CONVERTER
Filed Feb. 5, 1946                        8 Sheets-Sheet 1
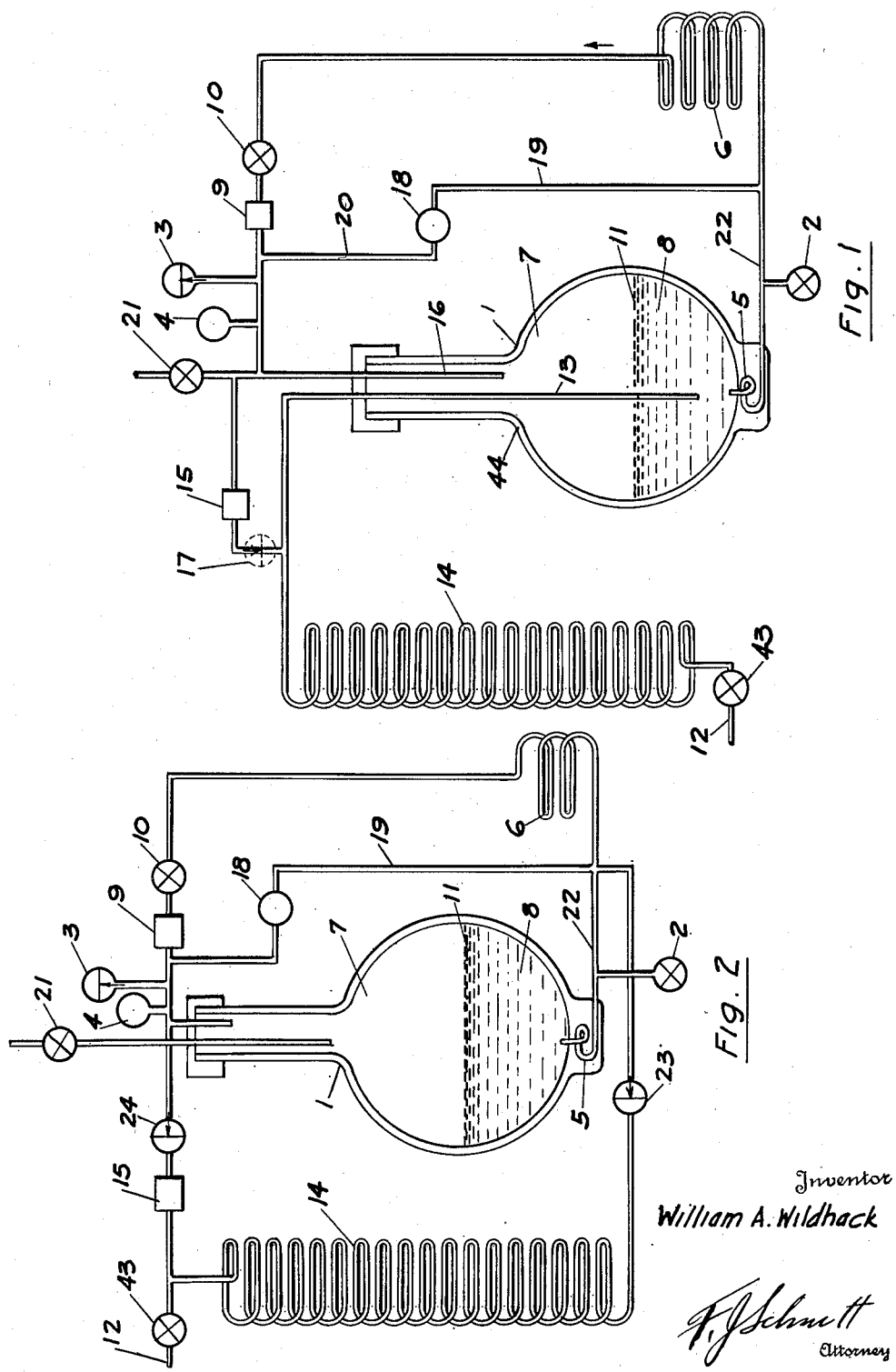
Inventor
William A. Wildhack Dec. 4, 1951 W. A. WILDHACK 2,576,985
LIQUID OXYGEN CONVERTER
Filed Feb. 5, 1946 8 Sheets-Sheet 2
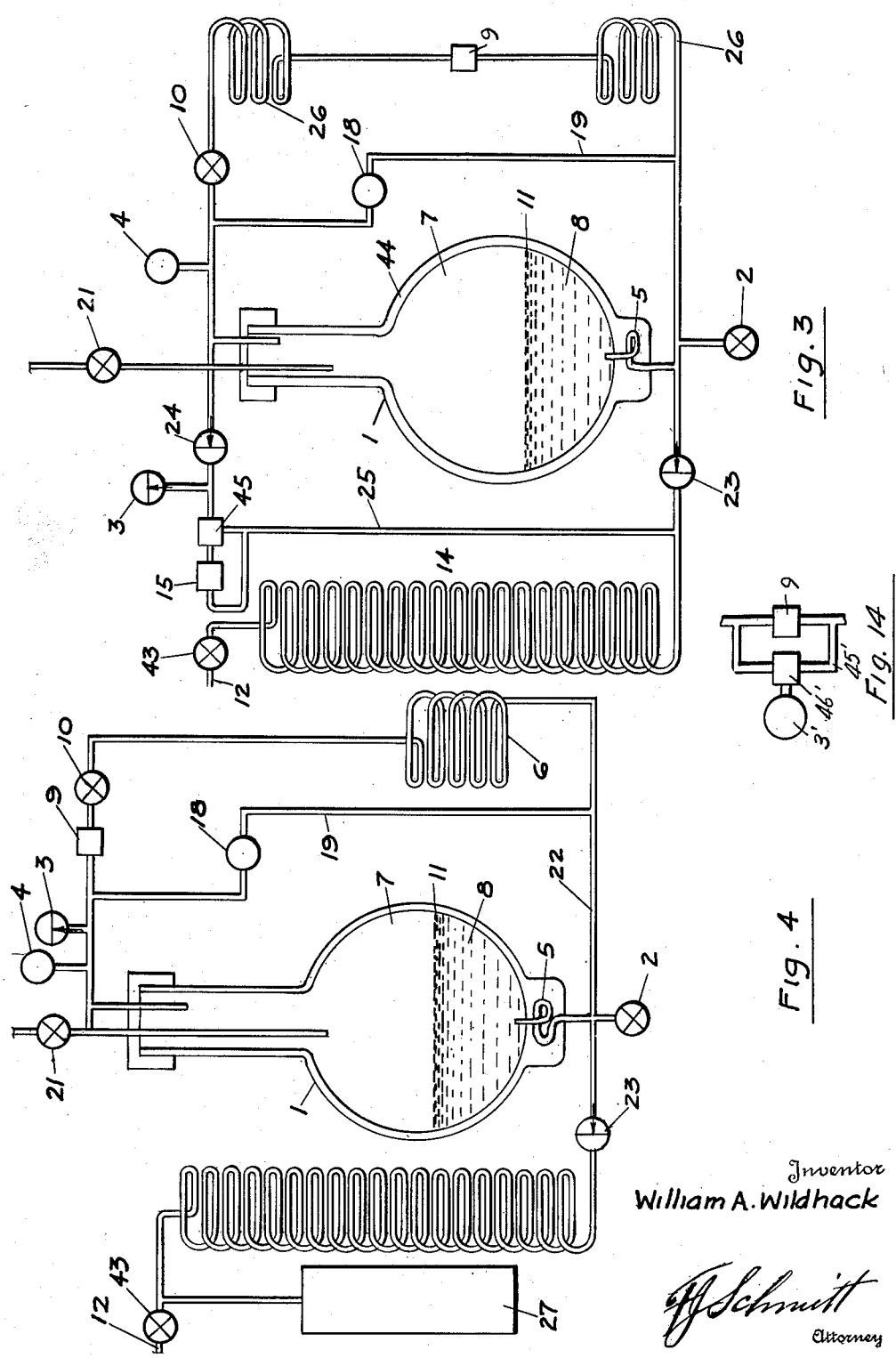
Inventor
William A. Wildhack
FJSchmitt
Attorney Dec. 4, 1951     W. A. WILDHACK     2,576,985
LIQUID OXYGEN CONVERTER
Filed Feb. 5, 1946     8 Sheets-Sheet 3
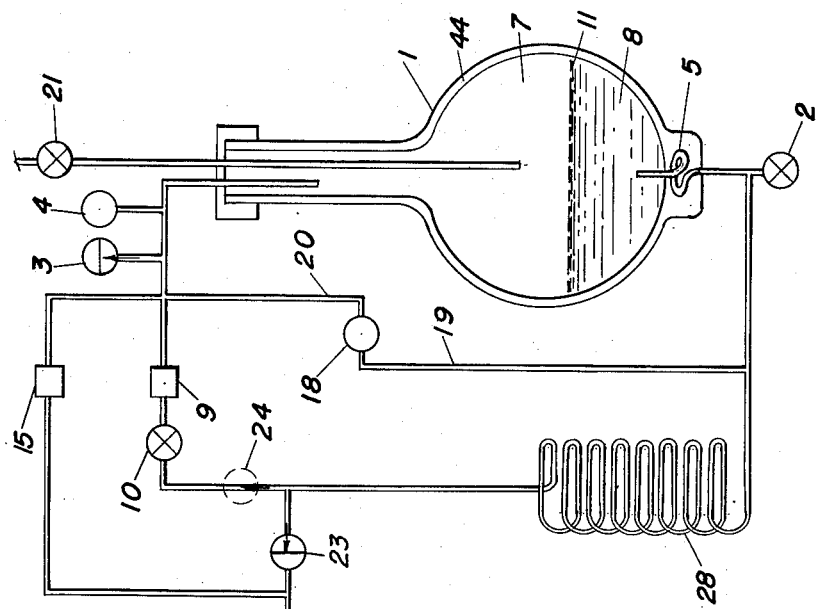
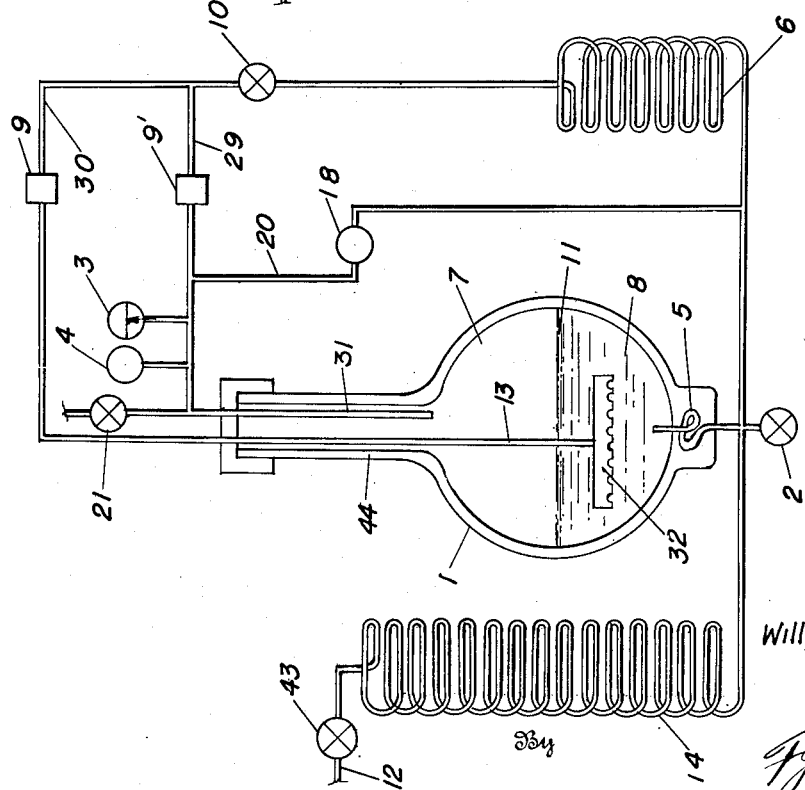
Inventor
William A. Wildhack Inventor
William A. Wildhack Dec. 4, 1951 W. A. WILDHACK 2,576,985
LIQUID OXYGEN CONVERTER
Filed Feb. 5, 1946 8 Sheets-Sheet 5

Inventor
William A. Wildhack
By
*F. J. Schmitt*
Attorney

Dec. 4, 1951 W. A. WILDHACK 2,576,985
LIQUID OXYGEN CONVERTER
Filed Feb. 5, 1946 8 Sheets-Sheet 7

Inventor
William A. Wildhack
By
G. J. Schmitt
Attorney

Dec. 4, 1951     W. A. WILDHACK     2,576,985
LIQUID OXYGEN CONVERTER

Filed Feb. 5, 1946     8 Sheets-Sheet 8

Inventor
William A. Wildhack

By J. J. Schmitt
Attorney

Patented Dec. 4, 1951

2,576,985

UNITED STATES PATENT OFFICE 2,576,985

LIQUID OXYGEN CONVERTER

William A. Wildhack, Arlington, Va.

Application February 5, 1946, Serial No. 645,692

23 Claims. (Cl. 62—1)

(Granted under the act of March 3, 1883, as amended April 30, 1928; 370 O. G. 757)

This invention relates to liquid oxygen converters, and more particularly to such converters adaptable for use in aeronautics for oxygen supply to personnel at high altitudes, for charging oxygen containers for such supply, and other similar purposes wherever controlled quantities of liquid oxygen might be desired to be transferred either as a liquid or converted and transferred in gaseous form most economically.

The main object of the present invention is to provide apparatus for handling liquid oxygen safely and economically and to construct means for transferring it either as liquid or converting it into gaseous form and transferring it to supply or storage containers or directly to the point of use, such as breathing masks, or for internal combustion engine or rocket feeding, etc.

A further object is to construct apparatus in connection with a liquid oxygen container for converting and delivering the oxygen in gaseous form at any required rate to a supply line in a most economical manner by simple and quickly responsive means.

Other and more specific objects will appear in the following detailed description of several illustrative embodiments of this invention, having reference to the accompanying drawings, wherein:

Figs. 1 to 6 illustrate diagrammatically various modifications of apparatus made in accordance with the present invention;

Fig. 12 illustrates diagrammatically an inverted container with a reentrant neck;

Fig. 13 is a sectional view of an adjustable pressure-closing valve; and

Fig. 14 is a detail of the relief valve arrangement for invertible container.

Figure 7:
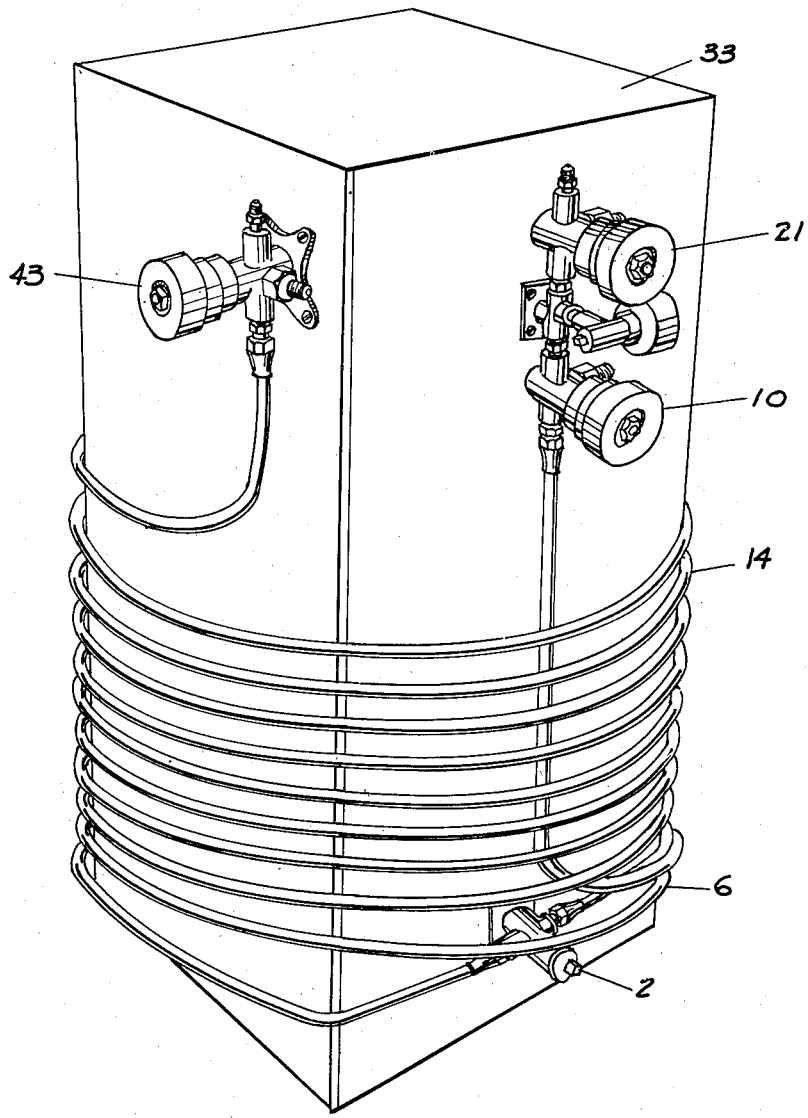
Fig. 7 shows one embodiment of the apparatus illustrated in Fig. 2 or 4.

Several models have been constructed of liquid oxygen converters of the atmospheric heater type incorporating a circulation system for obtaining quick build-up of pressure to the operating value.

All of the several models constructed and tested utilize the circulation system which is described below. The descriptions given are mainly schematic, with few details of construction, particularly since much of the construction will vary in accordance with requirements.

Schematic drawings are presented to illustrate various arrangements of the essential components. Other schematic drawings show the construction and operation of some of the components.

PRINCIPLE OF OPERATION

In the closed circulation system for pressure build-up, characteristic of these converters, liquid flowing by gravity from the bottom of the charge is evaporated by atmospheric heat at a level lower than that of the surface of the liquid in the container; the resulting gas continues through the warming coil and is forced by the pressure of the liquid column into the space above the liquid, or back into the liquid at a higher level. This gas condenses, warming the liquid with which it comes in contact and forming a heated layer, at the liquid surface, of higher vapor pressure. The pressure increase is the same in the liquid phase as in the gaseous phase, so that the circulation, which depends only on a differential pressure due to the height of the liquid column above the evaporator, continues the process until stopped by a pressure-operated valve, or, in an ultra high-pressure system, until the density of the warm gas at the high pressure approaches that of the liquid.

Since the density of liquid oxygen decreases rapidly with increasing temperature, the heated liquid tends to rise or to stay on the surface. Thus it is easily possible to obtain a high pressure over the liquid quickly by supplying to the surface layer only a small fraction of the heat which would be required to warm the whole charge to the same temperature. In time, the whole charge will be brought to the equilibrium temperature for the controlled pressure, because of heat exchange in the charge.

Oxygen is supplied to the distribution system through the same, or a separate, evaporator, and is evaporated and warmed to usable temperatures by heat from the surroundings.

While the evaporation of the oxygen, both for the pressure build-up and for the supply, is done by atmospheric evaporating coils in the models to be described, it will be apparent that the same principal of operation could be employed with electric or flame heating.

DESCRIPTION OF VARIOUS CONVERTERS

In the description of the several arrangements of components as complete conversion systems, the simplest will be discussed first. The advantages of the several types for various applications will be apparent as they are introduced.

Model I

The schematic diagram of Model I is shown in Fig. 1. Besides the container 1, filling and withdrawal means 2, relief valve 3, and pressure gage 4, there are four rather independent flow or pressure circuits which are parts of the total converter assembly: the pressure build-up circuit, the supply circuit, an optional economizing circuit, and the contents measuring circuit.

*Pressure build-up circuit.*—The container 1 having a vacuum jacket 44 is provided with a bottom connection which has a gooseneck 5 or other liquid trap. Attached to this is an evaporating and warming coil 6 (pressure build-up evaporator) which is connected to the vapor phase 7 above the liquid 8 through a pressure actuated valve 9 which closes when the pressure above atmospheric attains the desired operating value. There is also a manual valve 10, which may be closed to prevent circulation and build-up of pressure until desired.

With the manual valve 10 closed, the pressure build-up evaporator is filled with gas; the liquid is prevented from trickling down by the liquid trap or gooseneck.

When operation is desired, the manual valve 10 is opened. The gas in the pressure build-up evaporator is acted upon at one end by the pressure of the liquid, at the other end by the pressure of the gaseous phase. The pressure difference is just that of the column of liquid. If no evaporation occurred, the liquid would then flow through the pressure evaporator until it stood at the same level inside the container and in the tube outside. Because of evaporation in the pressure evaporator coil an unbalance of pressure occurs and persists and causes a continuing circulation, forcing gas into the space 7 above the liquid and increasing the pressure by compression. This pressure is transmitted through the liquid, so that the pressure at the bottom of the liquid increases at the same rate as that above it.

The rate of increase of pressure would be limited only by the rate at which the inflow of gas due to the circulation would increase the pressure in the volume above the liquid, were it not for a retardation of the process occasioned by the condensation of the gas on the top of the liquid. However, the heat of condensation tends to warm the top layer of the liquid 8, so that a layer 11 of warmed liquid is formed, in which there is a steep temperature gradient. Because of the lower density of warm liquid, this warm layer tends to float on top and to stay on top even when disturbed, and persists for some time even when moderate shaking occurs. When the pressure has increased to the desired value, the pressure operated valve 9 closes, stopping the circulation. Without this control, the pressure would continue to increase indefinitely unless the manual valve 10 were again closed.

The rate of increase of pressure is a function of the pressure of the liquid head, the efficiency of the evaporating and warming coil 6, the resistance to flow in the circulation circuit, the volume of the gas phase, and the area of the liquid surface. In practice, the pressure has been raised from atmospheric to 50 p. s. i. gage in from one to 20 minutes, the longer time being required in a model in which there was a considerable restriction to flow in the connection to the drain tube. From 2 to 5 minutes appears to be a reasonably attainable performance for service models. If a cylindrical container were used, an insulating float covering most of the liquid surface might aid in reducing the amount of gas to be condensed and reduce the time required.

*Supply circuit.*—When a flow of oxygen is required in the delivery line 12, the supply connection 43 is opened and the decrease of pressure in the line allows liquid to be forced up the tube 13 and into the main evaporating coil 14, where it evaporates and is warmed. The temperature differential between the delivered gas and the ambient air is, of course, dependent on the size and efficiency of the warming coil, which must be designed to meet the requirements for the particular application.

The maximum continuous flow which can be evaporated and warmed to within 10° C. of ambient temperature is a reasonable criterion of the performance required for aircraft use. In various models, rates from 20 to 200 liters per minute at standard temperature and pressure (lpm, stp) have been obtained. For the highest rate a coil of 80 feet of 5/8-inch I. D. dural tubing was used.

The pressure drop across the warming coil must be considered, particularly since it is desirable to provide for peak flow rates considerably larger than the continuous rating. A tube of relatively large diameter is thus preferred, especially since it is, in principle, about the only limitation on the instantaneous flows available.

*Economizing circuit.*—When the whole mass of liquid has been warmed to a temperature corresponding to the working pressure, or above, it may be desirable to draw gas from above the liquid and thus prevent loss of gas through the pressure relief valve 3. This may be done by a pressure-opening valve 15, connected as shown in Fig. 1, which opens at a pressure somewhat above that at which the pressure-closing valve 9 closes.

During delivery, then, gas will be drawn from the vapor phase above the liquid through tube 16, pressure opening valve 15 and coil 14 until the evaporation has cooled the remaining liquid and reduced the vapor pressure sufficiently for the pressure-opening valve 15 to close again.

When not delivering, the opening of the pressure-opening valve has no effect; the pressure continues to rise slowly, at a rate determined by the amount of liquid and the degree of insulation of the container, until the pressure relief valve 3 begins to leak. Gas will then escape at a rate determined by the heat flow into the liquid.

If used under conditions of frequent intermittent delivery, it may be desirable to provide a check valve 17 between the pressure-opening valve 15 and the delivery line 12, as shown in Fig. 1, to prevent over-pressure being developed by evaporation of residual liquid in the evaporator forcing gas into the space above the liquid after delivery has stopped, with resultant loss through the relief valve. The excess gas would then bubble back through the liquid and condense, at least partially. The provision of a ballast tank, or receiver, in the supply circuit would also be effective in reducing such losses.

*Contents indication.*—The amount of liquid remaining in the container may be determined by the difference in pressure between the gas phase and the bottom outlet.

A differential pressure gage 18 of a range 0 to 10 or 20 inches of water connected as shown is suitable for this purpose. The differential pressure is, of course, not proportional to content for a spherical container, and the gage must be designed or calibrated accordingly.

The lines 19 and 20 to the gage may be of very small, light tubing, and may extend to a considerable distance, providing for remote indication.

The conditions of use here require that the case of the gage should be able to withstand a pressure greater than the normal delivery pressure. Such gages are not readily available commercially.

Several small mercury manometers, fitted with sintered glass stoppers, have been used successfully. The mechanism from an aircraft fuel-quantity gage can be used when placed in a suitably strong case, but the size, weight, and the thickness of the cover glass required are objectionable features. Suitable gages have been made along these lines.

*Filling.*—Provision is made in the model shown for filling at either the top through a vent or filling valve 21, or the bottom of the container, and for withdrawal at the bottom. For convenience in filling or withdrawal, a quickly detachable connector is desirable. This connector must function at liquid air temperature, and should be suitably protected so that frost does not get into the system. With a suitable connector, other converters of smaller size can be readily filled from one of the type shown. No entirely suitable connectors are available commercially, but experimental models have been constructed and found to work satisfactorily.

Model II

One source of heat leak can be removed by modifying the arrangement of Fig. 1 as shown in Model II illustrated in Fig. 2, to eliminate the siphon tube 13. Liquid is then withdrawn for the main delivery from the bottom connection 22. This has a disadvantage, however, if used under conditions which make desirable the reduction in pressure by withdrawal from the gaseous phase in the container, in that a check valve must be installed in the circuit between the liquid connection and the gaseous phase connection. Otherwise, when the pressure rose enough to open the pressure-opening valve 15 a circulation would occur to cause the pressure to increase further, just as in the pressure evaporator circuit. This check valve may be in the main evaporator coil circuit, as at 23, loaded so that it will not leak at the maximum differential pressure created by the head of liquid, or it may be in the line from the gas phase to the supply connection, as at 24. In the latter position it requires no loading, but when the pressure-opening valve 15 is open and delivery is occurring withdrawal will not occur from the gas phase unless the pressure drop through the main evaporator coil 14 exceeds the head of liquid. The preferred position therefore is in the main evaporator circuit, as at 23. If both valves are used in the positions shown in Fig. 2 there may be danger of excessive pressure in the main evaporator or wastage during intermittent use, unless the loaded one is made double acting or is replaced by a mere restriction, to allow liquid to reenter the container instead of being trapped in the evaporator coil. The location of the pressure relief valve 3, as shown in Fig. 3, avoids the danger of excessive pressure. Also, if valve 23 is placed at the top of the main evaporator coil, this difficulty is avoided. With the circuit as shown in Fig. 2, the gas obtained when the pressure opening valve 15 is opened may be too cold, since the gas from above the liquid is not passed through a warming coil. If the pressure opening valve offers some restriction to flow only a fraction of the demand will be supplied through the pressure opening valve circuit, and the average temperature of the gas delivered will be acceptably high.

By connecting the pressure opening valve circuit to the bottom of the coil 14 instead of the top, the gas may be warmed by passage through it.

Model IIA

In aircraft applications it may be required that the device work in an inverted position. A few changes in the arrangement of the Model II will provide for this, as shown in Model IIA, Fig. 3. The design of the converters, considered later, Model Nos. IIB and III and liquid warming type, can be similarly modified to secure operation in the inverted position.

*Inverter pressure circuit.*—The pressure building circuit is essentially like the one in Fig. 2, except that a few turns 26 of the coil (which may still be of the same total length) are placed at either end. The pressure-closing valve 9 can be anywhere in the circuit, but if placed as shown will never have to operate at liquid oxygen temperatures.

*Inverter supply circuit.*—The only modification required in the Model II supply circuit is the addition of a line 25 connected into the supply line near the bottom of the container and into the gas phase near the top through a gravity valve 45 which will allow flow in the vertical circuit and will prevent flow through the pressure opening valve 15 when the apparatus is inverted. The check valves 23 and 24 as shown in Fig. 3 prevent this added circuit from functioning as a pressure-building evaporator, and ensure that when in the inverted position liquid will be drawn through it, rather than gas being withdrawn from the gas phase.

Model IIB

Unless the pressure at which the relief valve 3 begins to operate is above the tolerable operating range, making it desirable to reduce the pressure by withdrawal from the gas phase, there is little need for the "economizing" circuit shown in Figs. 2 and 3.

Loss of oxygen will occur only when the whole charge has warmed sufficiently to cause the relief valve to open, and the loss will amount only to the normal evaporation rate over the remaining period of standing and use. If the period of use is only a matter of hours, the saving of this small amount may hardly justify the use of the pressure-opening valve 15.

The omission of both the check valves 23 and 24 and pressure opening valve 15 gives the simplest system, but the supply circuit check valve 23 may be retained, if sufficient ballast volume 27 is included in the delivery circuit to limit the pressure built up by evaporation of trapped liquid. The converter so modified is shown in Fig. 4.

The ballast tank 27 and check valve 23 are desirable only in applications where the withdrawal is quite variable or intermittent.

Model III

As another variant, still simpler in design, the pressure-building evaporator may be combined with the main delivery evaporator as in Fig. 5. In designing the single evaporator 28, it is necessary that under normal delivery rates the liquid level be lower in the coil than in the container by an amount greater than the pressure drop in the coil for that delivery rate. This maintains the flow in a direction so that an adequate gas phase pressure at the container is maintained when the pressure-closing valve 9 is open. Abnormally high delivery rates may be obtained intermittently, the pressure building up to normal during periods of lower delivery. A lightly loaded check valve 24 may be included in the pressure circuit to ensure that gas is not withdrawn from the gas phase during such periods when the pressure happens to be below normal.

For this arrangement, also, a pressure-opening valve 15 may be added to permit withdrawal from the gas phase when the pressure is above normal, as shown in Fig. 5. With this, however, a loaded check valve 23 is also required to ensure that the pressure during delivery, at the connection between the pressure-opening valve and the delivery line, is less than in the gaseous phase in the container. Without this, there would be the possibility of circulation through the pressure-opening valve, causing the pressure to build up still higher. The best location for this check valve is as shown in the figure.

Liquid warming model

It may, for some applications, be desirable to warm the whole mass of liquid, so as to maintain pressure during severe vibration, shaking or inversion.

If the delivery tube from the pressure circuit is installed so that its end is not in the gas phase but below the surface of the liquid, the gas will bubble up through the liquid, partially condensing and causing circulation of the liquid. Although the pressure in the gas phase will now not rise so rapidly as before, the temperature of the entire liquid mass will be raised. Such arrangement is shown in Fig. 6. For rapid pressure build-up, two parallel branches 29 and 30 of the delivery line from the evaporating coil 6 are used—one ending in the gas phase at 31, the other terminating below the surface of the liquid either as an open end tube or in a diffuser or bubbler 32. Two pressure-closing valves 9 and 9' are then required, one in each branch, adjusted so that the gas phase line is closed at a lower pressure than the liquid phase line. For liquid warming, the tube from the pressure build-up circuit could reenter the container at or near the bottom equally well. It is worth noting that it would not be necessary, in this arrangement, that the liquid should vaporize in the coil; the large variation of the density of liquid oxygen with temperature would assure circulation just as in a hot-water heating system, if the average temperatures were different in the two sides of the circulation circuit.

Charging converter

As a converter of oxygen, the applications of the device so far described would presumably be mainly in supplying breathing oxygen in hospitals and in aircraft, and supplying welding and burning oxygen in industry. Another application which may be of some importance is in charging high pressure cylinders with gas. For this use, the converter must be structurally able to withstand the charging pressure. This requires a special container, but otherwise nothing other than conventional design.

It has been mentioned that the limiting pressure possible of theoretical attainment by the "circulation-pressure" method is that at which the density of the gas in the outer coil, at the coil temperature, approaches the density of the liquid. If the liquid were originally in equilibrium with atmospheric pressure, its density would be about 1.1 g./cc. Gas at room temperatures would have to be at a pressure of nearly 10,000 p. s. i. to equal this density. It appears theoretically possible, therefore, to obtain very high pressures by this method. The limit has not been investigated because of the lack of suitable containers, but a pressure of 3000 p. s. i. was obtained easily.

A small experimental high-pressure charging converter is shown in Fig. 7. The schematic design is basically that of Model II, Fig. 2 or 4, except for accessories. The container is a steel cylinder of 96 cu. in. capacity, modified by the addition of a stainless steel tube connected to the top, inside the box 33 which is filled with silica aerogel for thermal insulation. The lower three turns of copper tubing 6 are in the pressure-building circuit; the others are the main evaporating coil 14.

As shown, a manual valve 10 is used for stopping circulation in the pressure build-up coil. A high pressure reducing valve has recently been modified for use as a pressure-closing valve.

With this apparatus a pressure of 2000 p. s. i. can be obtained in about two minutes. The warming capacity of the evaporation coil 14 is quite small, but sufficient for charging other 96 cu. in. cylinders at the rate of about one cylinder in two or three minutes. For larger service models, any of the methods known in the art of heat interchanger design could be used to increase the conversion rate. Several coils could be used in parallel, if desired, or the evaporator could be surrounded by water, ventilated by a forced draft, or heated by a flame or electric heater. In charging cylinders, a high conversion rate is desirable, but there is no need for the delivered gas to be warmed very near the ambient temperature.

Since the rate of delivery may be excessive in charging a cylinder at low pressure, if no limitation is provided when the charging valve is opened, it will be desirable to install a flow regulator or flow indicator. A differential pressure gage across a restriction is a simple method of indication, if suitably strong differential gages are available. A pressure-opening valve, installed near the charging valve, would serve as a flow regulator if the restriction to flow in the evaporator were made such that the pressure drop for excessive flow would cause the pressure-opening valve to close, when the pressure in the liquid container was just at its normal value.

Liquid transfer

When the main evaporator is replaced by an insulated delivery line, a liquid transfer apparatus results. A pressure of even 5 to 10 p. s. i. suffices for dispensing liquid rapidly from the pressure container to other containers, at atmospheric pressures. Delivery at 50–100 p. s. i. is practicable with commercial containers, and pressures of 400 p. s. i. are possible with special containers. Recharging of high pressure converters without blowdown loss is thus possible, when they are used in such a manner that the gas pressure can be reduced to fairly low values by successive equalization of pressure with several of the empty cylinders to be charged.

The pressure built up for forcing the liquid through the delivery line does not involve warming of the delivered liquid; hence, cold liquid of low vapor pressure can be delivered. This eliminates the evaporation which would otherwise occur in open receiving containers if all of the liquid had to be warmed to generate pressure to permit transfer. It also makes possible the transfer, in closed systems, of sub-cooled liquid of which the vapor pressure is even less than atmospheric.

Higher pressure equipment of this type may serve in fuel and gas injection in rocket and jet engines, and for supercharging engines for power bursts.

Electrically heated converters

It is clear that any of the foregoing designs can be easily modified to utilize electric power for evaporating and warming the oxygen, if desired. An electric heater of relatively small capacity would serve in the pressure evaporator circuit. A pressure operated switch would be required to cut off the power when not needed, in addition to the pressure-closing valve.

A larger heater in the main evaporator circuit would require a thermal switch, or, preferably, a variable thermal control, to provide automatic control of the power in proportion to the demand.

The use of electric or flame heating may be desirable in some applications, as where utmost economy of space is required, or where power is dependably available, or, as in large capacity converters, where the size of the atmospheric type evaporator would be excessive.

Test model converters

All the foregoing arrangements embody the same principles and all can be used for the general purpose of converting liquid to gas. The choice of particular arrangements and the need for the various accessories will depend on the condition of use in the application intended. The problems of structural design for adaptation to particular applications will not be considered in detail here. In actual construction for service use, the coils would be wrapped around a framework supporting the container, and the accessories grouped for accessibility and compactness.

Figure 8:
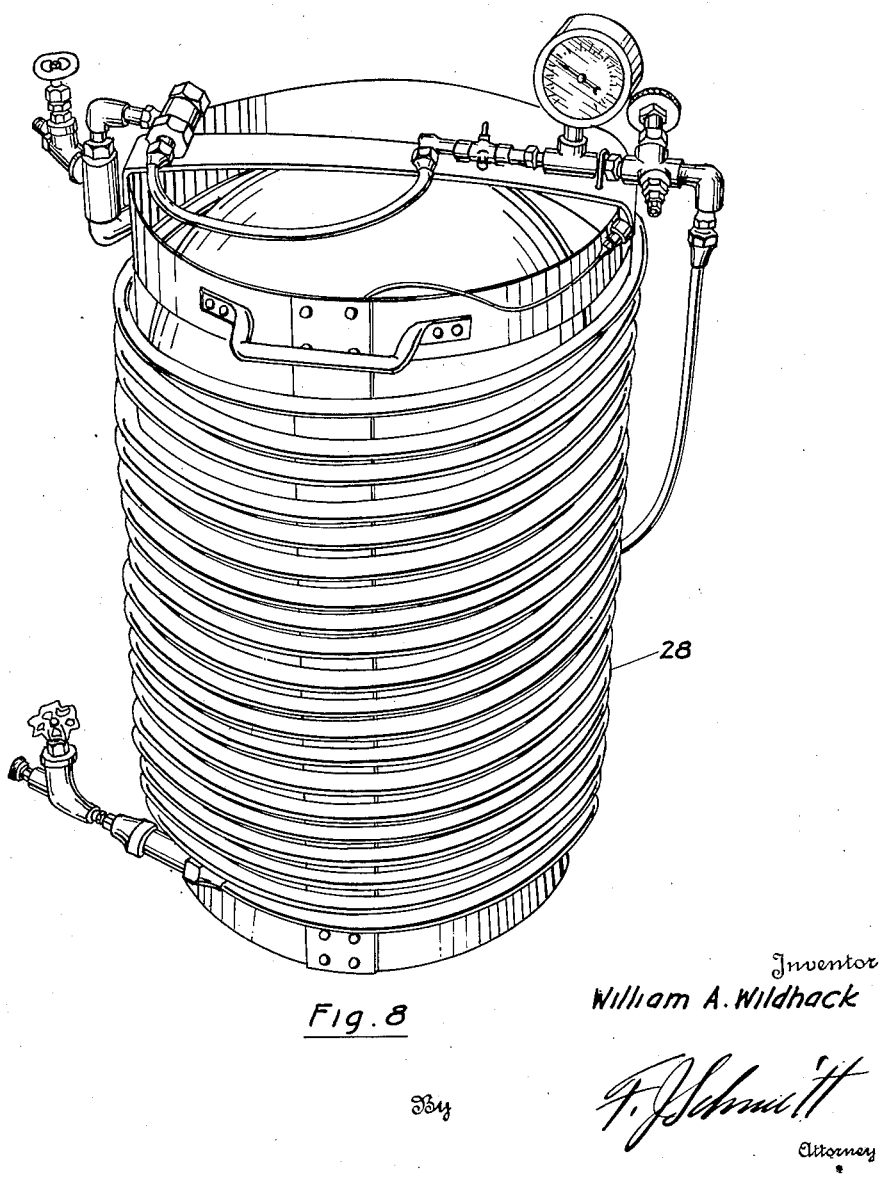
Fig. 8 shows an embodiment of the apparatus illustrated in Fig. 5 with certain simplifications.
Figure 9:
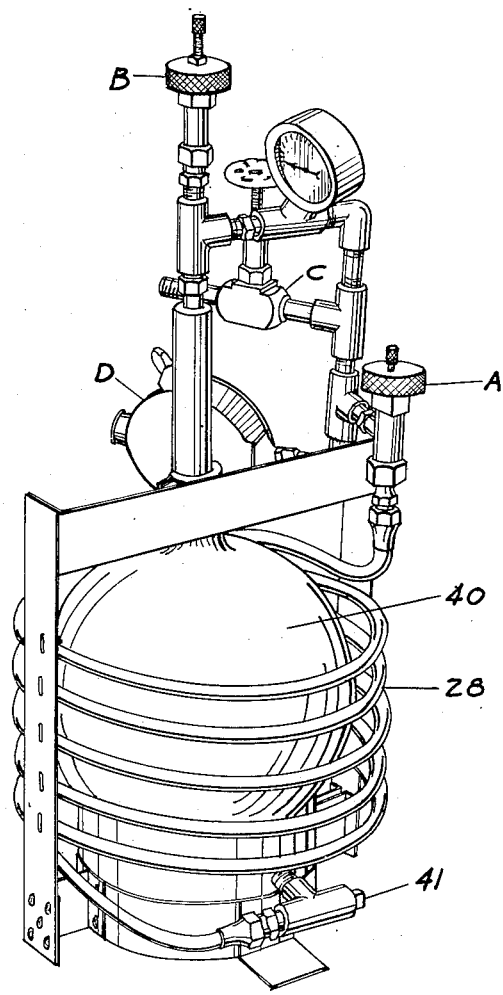
Fig. 9 is another embodiment of apparatus similar to that illustrated in Fig. 5, but having the pressure closing valve in a different position.

Illustrations of two usable experimental models are shown in Figs. 8 and 9.

Figure 10:
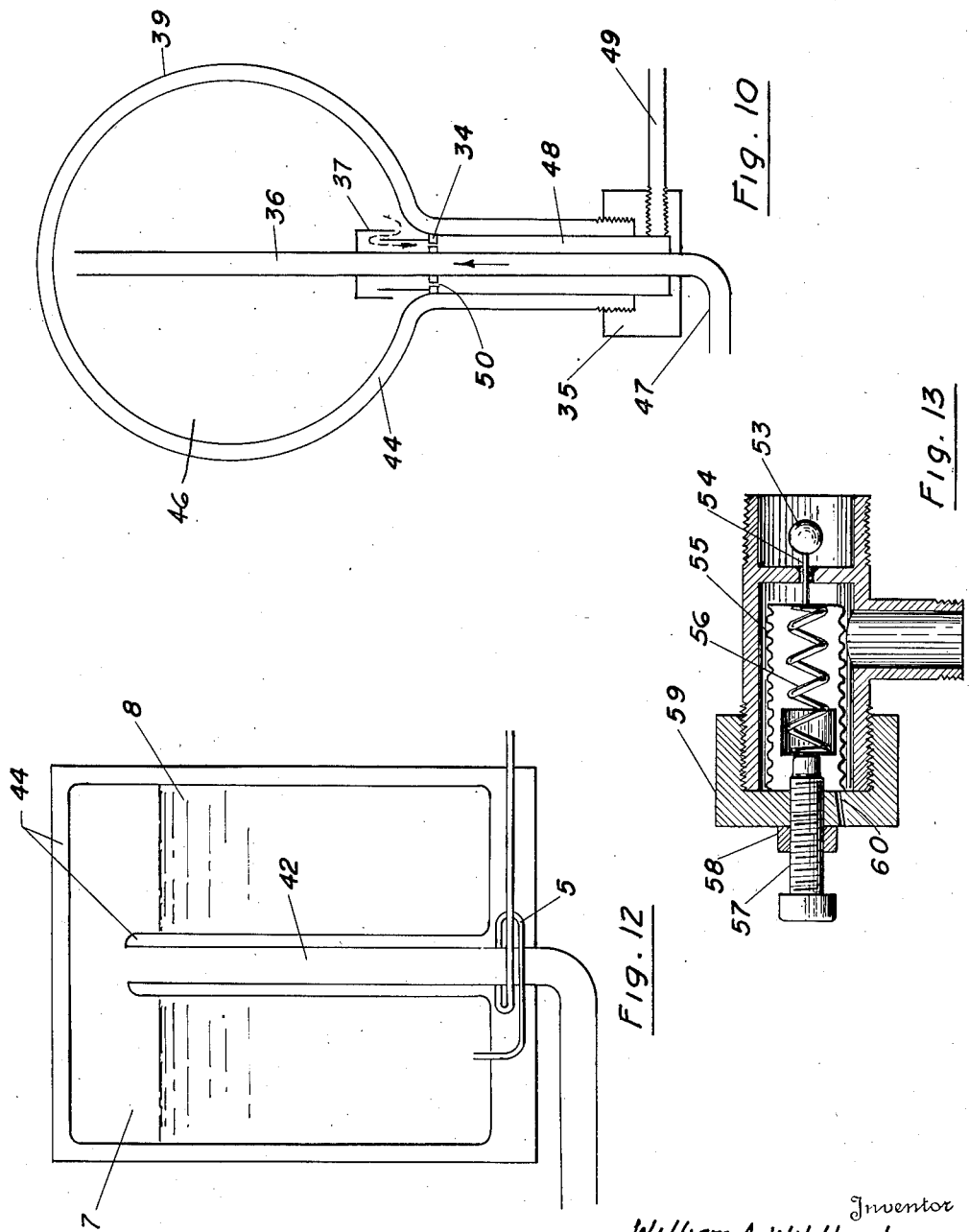
Fig. 10 shows diagrammatically a vertical tube and liquid trap which may be used for inverted containers.

With the ordinary containers, it is sometimes more convenient to use the container in the inverted position, and to make a liquid trap and gas phase connection for insertion in the neck, than to make the extensive alterations necessary for installing the extra drain tube. The construction of such a trap and tube arrangement is shown in Fig. 10. The Invar ring 34 was made of such a diameter as to slip smoothly into the neck when at room temperature. When liquid is put in the container the neck is cooled and contracts to make a tight seal against the Invar. The liquid trap 37 was installed inside the neck, surrounding a tube 36 which extended vertically nearly across the spherical cavity 46, providing access to the gas phase. This tube is connected to the pipe nipple 47 directly below the head 35. When the whole assembly was inverted, the liquid, when not restrained by gas pressure, trickled through the trap 37 and drain holes 50 into the annular space 48 in the neck and out through the connection 49 on the side of the head.

Figure 11:
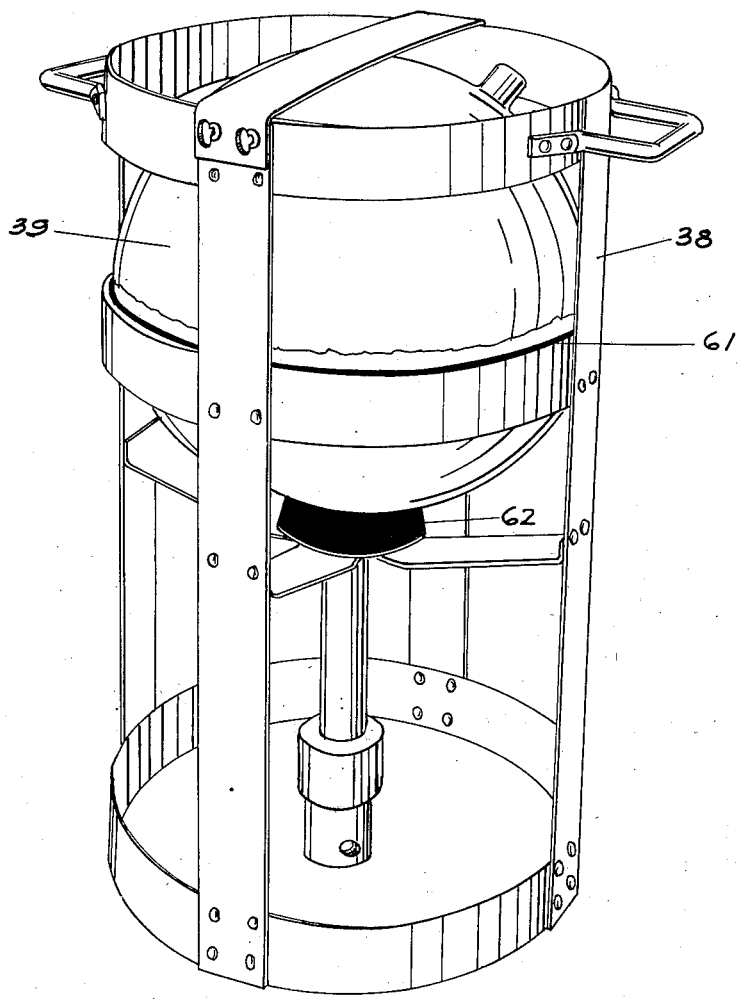
Fig. 11 is an embodiment of a container such as illustrated in Fig. 10, mounted in a frame.

A 15-liter container 39, equipped with a head 35, tube 36 and trap 37 such as shown in Fig. 10, is shown mounted in a frame 38 in Fig. 11. The same apparatus, with the added components necessary to make a converter, is the one shown in Fig. 8. In this converter the main evaporator coil 28 is used also for pressure build-up as shown schematically in Fig. 5.

The small converter shown in Fig. 9 has a 2½-liter container 40, modified by the addition of the bottom drain 41. In this arrangement the coil 28 in the pressure circuit serves also as the main evaporator coil, as in Model III, Fig. 5, but the position of the pressure-closing valve is different, so that it is called Model IIIA. Referring to Fig. 9, valve A is the pressure-closing valve, combined with a manual closing override, set to maintain a pressure of 15 p. s. i. Valve B is the pressure relief valve with manual opening override; valve C is for venting; the regulator D, designed to operate on 15 p. s. i., is a device for varying the air dilution of the oxygen as a function of altitude and is usually referred to as a diluter-demand regulator.

The connections are made so that withdrawal is first from the gas phase; then when the pressure falls sufficiently to cause valve A to open, some part will come from the coil. For continuous delivery at a high rate, this arrangement is not satisfactory, as the pressure cannot be maintained at high flow rates. For supplying one person, however, where the delivery is interrupted with each expiration, the performance is acceptable. With the pressure-closing valve in the line between the regulator and the gas phase, the operation may be uneconomical because liquid vaporizing during the expiratory phase may bubble back into the liquid, soon warming it and creating excess pressure which can be relieved only by escape of gas through the relief valve.

PERFORMANCE REQUIREMENTS OF COMPONENTS

The following brief discussion is limited to the salient features of the various components and problems incident to their construction and performance.

(a) *Container*.—The conventional metal Dewar flasks used as laboratory storage containers are satisfactory for use where the pressures are low (under 50 p. s. i.) and the conditions of service are not severe. High accelerations, vibration, and higher pressures require sturdier construction.

The conventional spherical shape, with protruding neck, is simplest to make and is fairly efficient. However, cylindrical shapes may be more suitable for some applications, and a shorter neck may be desirable for compactness.

To gain the advantages of a long conduction path and at the same time obtain compactness, a multiple reentrant neck could be used.

An "inverted" container, as shown in Fig. 12, which has been used experimentally, was made with a reentrant neck 42. This is quite simple and compact. For sturdier construction in larger sizes the inner neck can be extended and fastened to the end with connecting or vent holes in the sides.

Another feature, which might be valuable, is a set of radiation baffles. These are thin metal sheets, insulated and separated from each other, interposed in the vacuum space between inner and outer shells. The use of N radiation shields will theoretically reduce the loss due to radiation to approximately 1/N, if the shields are as good reflectors as the vacuum surfaces of the container.

In commercial containers, of 15 or 25 liter capacity, more heat leak occurs by radiation than by conduction along the neck. The use of radiation shields might therefore be expected to reduce the total heat leak to perhaps ½ to ⅓ of the usual value. The use of a longer neck, or one of lower specific heat conductivity, might reduce this fraction still further. As long as the major heat leak is by radiation, the gain possible by redesign of the neck appears comparatively small; but if radiation leak is reduced by use of several shields, to ¼ or ⅕ of its original value, then the conduction becomes the major heat leak and slight improvements are comparatively greater, on a percentage basis.

For this reason it appears desirable to make the neck of stainless steel, since its ratio of strength to heat conductivity is higher than for any other structural material.

An alternate construction would be to support the inner container by long wires of low heat conductivity, with coiled tubes for access to the cavity. When the access tubes are not used for support, they may be made of corrugated tubing to further increase the heat leak path.

These considerations are not of much importance for aircraft use, where long storage of liquid in the converters may not be necessary, but are more applicable to storage containers.

(b) *Supporting frame.*—The provision of adequate support and restraint for the container is of great importance for aircraft use.

The container needs to be protected from blows which might dent or rupture the outer shell, and from shocks which might overstress the inner neck. Also the occupants of the aircraft need to be protected from pieces of the apparatus if it blows up when hit by gunfire.

Gunfire tests made by the Bureau of Aeronautics have shown that the containers of the type used in the experimental work described, and contemplated for service use, fail when hit centrally by gunfire when under pressure. The usual failure is complete rupture of inner and outer spheres at the equator.

For safety, the container should be strengthened to prevent this failure, or an auxiliary enclosure should be provided to restrain the parts from being blown away. The latter solution has seemed easiest to pursue. A network of small cable, holding top and bottom collars on the container, has been found to prevent large fragments from flying. As these collars may also serve as means for supporting and restraining the container, when fastened to the supporting frame, the cost of the increased safety in added weight is fairly small.

It probably will be desirable to provide some shock absorbing suspension or material, such as sponge rubber or felt, between the framework and the container, to minimize jarring, as shown at 61 and 62 in Fig. 11.

(c) *Liquid connection.*—The liquid drain tube is best made of stainless steel, for the same reasons as given above. Thin walled tubing can be used and a considerable length can be coiled inside the evacuated space, so that the added heat leak due to this connection can be made very small.

The geometrical design of this drain tube should be made with the requirements of the contents gage in mind. The pressure-measuring connection of the gage is made just outside the container wall. This connection should be at a level such that the pressure at that point will be the same whether the tube is filled with liquid, as during withdrawal, or filled with gas from the liquid trap or gooseneck outward, as when not in use.

(d) *Pressure evaporating coil.*—This coil should offer relatively low resistance to flow, and should be located so that evaporation occurs at a level below the bottom of the liquid charge. Since the amount of liquid which is evaporated in this coil is small, a length of only a few feet is sufficient. For a 15-liter container, 10 feet of ⅜-inch O. D. tubing has been found adequate.

(e) *Pressure-closing valve.*—This valve should offer low resistance to flow when open; should close in a narrow pressure range; then should be nearly leak tight against the pressure differential due to the head of liquid in the container. For ease of construction, all the experimental models used have been made with one side of the pressure actuated bellows open to the atmosphere. Thus the valve opens when the gage pressure in the container falls below the set value. Equally well, the valves could be constructed with sealed bellows, to maintain a constant absolute pressure in the container. The gage pressure would then vary with altitude. Since the operation of low-pressure oxygen regulators (e. g. those designed for supply pressures of 10–15 p. s. i. gage) is dependent on gage rather than on absolute pressures, the maintenance of nearly constant gage pressure is desirable in supplying these regulators. A deviation of 5 or 10 p. s. i. in the gage pressure might seriously affect their performance. With regulators operating on pressures of 50 p. s. i. or higher, a variation of 5–10 p. s. i. is not apt to be critical, and there is no basis for choice between constant gage or constant absolute supply pressures.

The schematic diagram of Fig. 13 illustrates the construction of an adjustable pressure-closing valve which has been found to have acceptable characteristics. The valve head 53 is attached by stem 54 to the bellows 55 backed by spring 56, the pressure of which may be adjusted by adjusting screw 57 which is locked in place by lock nut 58. The adjusting screw extends through the valve chamber head 59 on which the bellows 55 is mounted. The inside of the bellows may be sealed for constant absolute pressure delivery or may be open to atmosphere, as by a vent 60, for pressure relative to atmosphere, or constant gage pressure. Similar valves have been constructed in which a manual-closing override is integrally provided.

(f) *Pressure-opening valve.*—The pressure-opening valve used in some arrangements operates on the same principle as the pressure-closing valve, but the valve opens instead of closing as the bellows is compressed. The construction therefore is quite similar. The initial adjustment should be such that this valve will not open until the pressure-closing valve has definitely closed, and that it will close on decreasing pressures before the other one opens.

(g) *Loaded check valve.*—The purpose of this valve, as used in the arrangement shown in Fig. 2, for example, is to prevent circulation and further pressure build-up when the pressure is already above the desired value, that is, when the pressure-opening valve is open. To do this, it must be nearly leak tight against the differential pressure due to the head of liquid. A circular metal disk, held by a coil compression spring on a circular ridged seat, gives an adequate seal. The flow capacity is not critical, but is should pass 100 l. p. m. on a pressure drop of not more than one or two p. s. i. This performance can be obtained easily.

(h) *Main evaporator.*—For convenience in design and fabrication, the evaporators so far used have been made of plain tubing. Finned tubing would probably be advantageous in some applications. Hardened aluminum alloy, 5/8 inch O. D., has been used in the converter of Fig. 8. This alloy is sufficiently hard that the coil serves as a rugged protecting shield for the container. The factors influencing the design of the evaporator are: the desired maximum continuous evaporation rate, the allowable pressure drop, and the mechanical considerations of size, ruggedness, and appearance. Formation of frost on coils must be taken into account, but with a spacing of half an inch or more between coils, frosting does not seem to be a major problem.

Using 80 feet of the 5/8 inch O. D. tubing, it was found possible to evaporate 200 l. p. m. continuously with a delivery temperature only 2° C. below ambient. In one test, 200 l. p. m. were evaporated for 15 minutes in humid summer weather, to form a good frost layer; then the apparatus was placed in an altitude chamber, and evaporation at 100 l. p. m. (stp) continued at a simulated altitude of 40,000 feet and at a chamber temperature of −35° C. The delivery temperature was 3 or 4° C. below ambient under these conditions. The frost which formed in these tests was very fragile, like snow, and the outer layers would often fall off. It is believed desirable that the tubing be blackened to promote radiation absorption. This can be done by dyeing while anodizing the aluminum.

(i) *Relief valve.*—Since excessive pressures may occur, due to long standing, leakage through the pressure-closing valve in the build-up circuit, or excessive heat leak because of structural failures, provision is required for venting gas to reduce or limit the pressure. A conventional spring-loaded relief valve is suitable for this purpose. Special requirements are that the leakage should be negligible at normal operating pressures, even after the pressure has previously been large enough to open the relief valve; the relief-flow capacity should be large enough to balance any heat leak apt to occur. To provide adequate emergency relief, a frangible disc may also be found desirable. The relief valve exhaust port should be so located that frost will not be formed where it can subsequently cause corrosion or freezing of the valve. The valve itself can be located so that the escaping gas under normal operation (venting just enough to balance normal heat leak) is warmed to ambient temperatures before reaching the valve.

(j) *Contents gage.*—As outlined earlier, the features of a suitable gage for indicating liquid content are merely that it respond to differential pressures which are proportional to the depth and density of the liquid, and that its case withstand pressures greater than the rated operating pressure.

A mercury manometer of glass or plastic is simple to design and is quite satisfactory except that the mercury may freeze. This would occur only when the ambient temperature was −40° C. or lower, however, since the liquid oxygen is far removed from the gage and has no cooling effect on it.

An alternative arrangement of the relief valve in the apparatus shown in Fig. 3, which may be used for invertable converters, is shown in Fig. 14 as a by-pass 45' around the pressure closing valve 9, with a gravity valve 46' for opening the uppermost passage of the by-pass in whichever position the converter is used, and connecting it to the relief valve 3'.

Reference is made to my copending application Serial No. 689,353, filed August 9, 1946, for modified arrangements of the apparatus herein described.

Various other obvious modifications in the construction and arrangement of parts of the apparatus described may be made without departing from the spirit and scope of this invention, as defined in the appended claims.

The invention described herein may be manufactured and used by or for the Government of the United States of America for governmental purposes without the payment of any royalties thereon or therefor.

What is claimed is:

1. Liquid gas converter apparatus comprising an insulated container having liquid and gas phase sections, a pressure build-up circuit having an evaporating and warming coil between the liquid and gas phase sections of the container, a supply circuit having an evaporating and warming coil connected to the liquid phase section, and a liquid trap device connected in the pressure build-up circuit between the evaporating and warming coil and the liquid phase section of the container.

2. Liquid gas converter apparatus comprising an insulated container, having liquid and gas phase sections, a pressure build-up circuit having an evaporating and warming coil between the liquid and gas phase sections of the container, a supply circuit having an evaporating and warming coil connected to the liquid phase section of the container, an economizing circuit having a pressure-opening valve and a check valve connected in series between the gas phase of the container and the supply circuit, and a liquid trap in the pressure build-up circuit between the evaporating and warming coil and the liquid phase section of the container.

3. Liquid gas converter apparatus comprising an insulated container having an upper gas receiving section and a lower liquid receiving section, a pressure build-up circuit having an evaporating and warming coil between the liquid and gas phase sections in the container, a supply circuit having an evaporating and warming coil connected at the base of said container to the liquid phase section, a liquid trap connected in the supply circuit between the liquid phase container section and said supply circuit coil, an economizing circuit having a pressure-opening valve and a check valve connected in series between the gas phase and the supply circuit, and a contents indicating means connected between the top and bottom of the container and responsive to and calibrated in accordance with the liquid level in the container.

4. Liquid gas converter apparatus comprising an insulated container having an upper gas receiving section and a lower liquid receiving section, a pressure build-up circuit having an evaporating and warming coil, a pressure actuated cut-off valve and a manually operated cut-off valve connected in series between the liquid and gas phases in the container, a supply circuit having an evaporating and warming coil and supply valve connected in series to the liquid phase section of the container, an economizing circuit having a pressure-opening valve actuated at a pressure above that of the pressure actuated cut-off valve and a check valve connected in series between the gas phase container section and the supply circuit, and a liquid trap connected in said supply circuit between the coil and container.

5. Liquid gas converter apparatus comprising an insulated container having an upper gas receiving section and a lower liquid receiving section, a pressure build-up circuit having an evaporating and warming coil normally below the level of the liquid in said container connected between the liquid and gas phase sections of the container, a supply circuit having an evaporating and warming coil connected to the liquid phase section of the container, said pressure build-up and supply circuits including a common circuit section connected to the container liquid receiving section, and a liquid trap inserted in said common circuit section.

6. Liquid gas converter apparatus comprising an insulated container having an upper gas receiving section and a lower liquid receiving section, a pressure build-up circuit having an evaporating and warming coil between the liquid and gas phase sections of the container, a supply circuit having an evaporating and warming coil connected for gravity flow from the liquid phase, a liquid trap in said supply circuit, an econonizing circuit having a pressure-opening valve, and a check valve connected in series between the gas phase container section and the bottom of the supply circuit evaporating and warming coil.

7. Invertible liquid oxygen apparatus comprising an insulated container, a pressure build-up circuit having an evaporating and warming coil composed of two sections, one of which is substantially below the level of the liquid in said container, the other being above said level, a pressure actuated cut-off valve between said sections and a manually operated cut-off valve connected in series between the liquid and gas phases of said container, a supply circuit having an evaporating and warming coil connected to the liquid phase through a liquid trap, and an economizing circuit having a pressure-opening valve and a check valve connected in series between the gas phase and the bottom of the supply circuit evaporating and warming coil.

8. Invertible liquid oxygen converter apparatus comprising an insulated container, a pressure build-up circuit having an evaporating and warming coil composed of two sections, one of which is substantially below the level of the liquid in said container, the other being above said level, a pressure actuated cut-off valve between said sections and a manually operated cut-off valve connected in series between the liquid and gas phases of said container, a pressure relief valve, a gravity operated check valve connected in a by-pass around said pressure actuated cut-off valve for connecting the uppermost section of the coil in either of the invertible positions of the converter to the pressure relief valve, a supply circuit having an evaporating and warming coil connected to the liquid phase through a liquid trap, and an economizing circuit having a pressure-opening valve and a check valve connected in series between the gas phase and the bottom of the supply circuit evaporating and warming coil.

9. Liquid oxygen converter apparatus comprising an insulated container, a pressure build-up circuit having an evaporating and warming coil composed of two sections, one of which is substantially below the level of the liquid in said container, the other being above said level, a pressure actuated cut-off valve between said sections and a manually operated cut-off valve connected in series between the liquid and gas phases of said container, a supply circuit having an evaporating and warming coil connected to the liquid phase through a liquid trap, an economizing circuit having a pressure-opening valve and a check valve connected in series between the gas phase and the bottom of the supply circuit evaporating and warming coil, and a loaded check valve in the supply circuit between the liquid trap and the evaporating and warming coil.

10. Liquid oxygen converter apparatus as defined in claim 7 wherein the container is provided with a reentrant neck for inverted operation and better insulation.

11. Liquid oxygen converter apparatus comprising an insulated container having oxygen liquid and gas phase sections therein, a pressure build-up circuit provided with evaporating and warming means connected between the liquid and gas phase sections in the container, a supply circuit communicating with the liquid phase section in said container and provided with evaporating and warming means for gasifying said liquid, a liquid trap connected in said supply circuit between said evaporating and warming means and the container liquid phase section, an economizing circuit provided with a pressure responsive and directional flow check means connected in series between the gas phase section in said container and said supply circuit, and a contents indicating means, responsive to the pressure head of said liquid, calibrated to indicate the head thereof and connected between the top and the bottom of said container.

12. Liquid oxygen converter apparatus comprising an insulated container having liquid and gas phase sections, an automatic pressure-controlled build-up circuit having an evaporating and warming coil between said container liquid and gas phase sections, a supply circuit having an evaporating and warming coil connected to the liquid phase container section, and a liquid trap device connected between said supply circuit coil and said liquid phase container section.

13. Liquid oxygen converter apparatus comprising an insulated container having liquid and gas phase sections, a tubular outlet connection to said liquid phase section, a liquid trap device connected in series with said outlet connection, a pressure build-up circuit having an evaporating and warming coil connected between the liquid and gas phase sections of the container, a supply circuit having an evaporating and warming coil connected to the liquid phase section of the container, both of said pressure build-up and supply circuits including said trap device whereby trickling of liquid into either of said evaporating and warming coils is prevented.

14. Liquid oxygen converter apparatus comprising an insulated container having liquid and gas phase sections, a tubular outlet connection to said liquid phase section, a liquid trap device connected in series with said outlet connection, a pressure build-up circuit having an evaporating and warming coil connected between the liquid and gas phase sections of the container, a supply circuit having an evaporating and warming coil connected to the liquid phase section of the container, both of said pressure build-up and supply circuits including said trap device and said outlet connection including a section protruding inwardly within the container whereby the port end of the connection is displaced from the container wall.

15. The liquid oxygen converter apparatus as defined in claim 1 including additionally a ballast tank connected to the supply circuit at the farther end of the evaporating and warming coil from said container.

16. The liquid oxygen converter apparatus as defined in claim 1, with said container being inverted and having a spherical shape with a neck portion through which the gas phase tube is passed extending approximately across the container space, and having the liquid trap device arranged around said tube at the inner end of the container neck portion.

17. The liquid oxygen converter apparatus as defined in claim 16, with the liquid trap having an annular Invar ring pierced with drain holes at the bottom of said trap.

18. The liquid oxygen converter apparatus as described in claim 1 with the connection from the supply circuit to the liquid phase container section including a siphon tube extending downwardly into said liquid phase section.

19. A high pressure liquid oxygen converter comprising an insulated container having upper and lower connections, a liquid trap in said lower connection, and one or more pressure build-up coils exposed to the atmosphere, connected in parallel between said upper and lower connections, and having a pressure closing valve and a control valve in series near the upper connection, said coils extending downwardly to a level below the bottom of said container.

20. A liquid oxygen container having upper and lower connections, a liquid trap in said lower connection, atmospheric heat absorption means connected between said upper and lower connections located at least partially below the level of the bottom of said container for vaporizing a portion of the contents and causing a circulation therethrough automatically, a pressure closing valve for stopping said circulation when a predetermined pressure is reached, and delivery means including an evaporator coil exposed to the atmosphere, said delivery means being open to the liquid phase in said container for delivering said oxygen at said predetermined pressure.

21. A liquid oxygen container having upper and lower connections, a liquid trap in said lower connection, atmospheric heat absorption means connected between said upper and lower connections located at least partially below the level of the bottom of said container for vaporizing a portion of the contents and causing a circulation therethrough automatically, a pressure closing valve near the upper connection for stopping said circulation when a predetermined pressure is reached, and delivery means exposed to the atmosphere connected to the lower end of said container for delivering said oxygen at said predetermined pressure.

22. A high-pressure liquid oxygen converter, comprising an insulated container having upper and lower connections, a liquid trap in said lower connection, one or more pressure build-up coils exposed to the atmosphere, connected in parallel between said upper and lower connections, and a warming delivery coil exposed to the atmosphere connected to the liquid phase in said container for delivering oxygen.

23. A main liquid container having upper and lower connections, a liquid trap in said lower connection, heat absorption means connected between said upper and lower connections located at least partially below the level of the bottom of said container for vaporizing a portion of the contents thereof and causing a circulation therethrough automatically, a pressure closing valve for stopping said circulation when a predetermined pressure is reached, and delivery means open to the liquid phase in said container for delivering said liquid at said predetermined pressure.

WILLIAM A. WILDHACK.

REFERENCES CITED

The following references are of record in the file of this patent:

UNITED STATES PATENTS

| Number | Name | Date |
|---|---|---|
| Re. 18,876 | Heylandt | June 20, 1933 |
| 1,505,095 | Heylandt | Aug. 19, 1924 |
| 1,781,048 | Braunstein | Nov. 11, 1930 |
| 1,872,831 | Siems | Aug. 23, 1932 |
| 1,942,944 | Smith | Jan. 9, 1934 |
| 1,953,533 | Edwards | Apr. 3, 1934 |
| 2,033,094 | De Motte | Mar. 3, 1936 |
| 2,035,396 | Mesinger | Mar. 24, 1936 |
| 2,040,059 | Mesinger | May 5, 1936 |
| 2,062,781 | Baufre | Dec. 1, 1936 |
| 2,180,090 | Mesinger | Nov. 14, 1939 |
| 2,362,968 | Bliss et al. | Nov. 21, 1944 |
| 2,396,459 | Dana | Mar. 12, 1946 |
| 2,434,956 | Prentiss | Jan. 27, 1948 |
| 2,435,332 | Van Vleet | Feb. 3, 1948 |
| 2,436,411 | Weaver | Feb. 24, 1948 |

FOREIGN PATENTS

| Number | Country | Date |
|---|---|---|
| 686,150 | Germany | Jan. 4, 1940 |
| 709,468 | France | Aug. 7, 1931 |